US012592119B2

(12) United States Patent
Lysaght et al.

(10) Patent No.: US 12,592,119 B2
(45) Date of Patent: Mar. 31, 2026

(54) MESSAGE DRIVEN GAMING SYSTEMS AND PROCESSES

(71) Applicant: DK Crown Holdings Inc., Boston, MA (US)

(72) Inventors: Mark Lysaght, Dublin (IE); Ozan Gursoy, Dublin (IE); Dhruv Ishpuniani, Dublin (IE); Victor Masutani, Dublin (IE)

(73) Assignee: DK Crown Holdings, Inc., Boston, MA (US)

(*) Notice: Subject to any disclaimer, the term of this patent is extended or adjusted under 35 U.S.C. 154(b) by 470 days.

(21) Appl. No.: 18/087,371

(22) Filed: Dec. 22, 2022

(65) Prior Publication Data

US 2024/0212432 A1 Jun. 27, 2024

(51) Int. Cl.
*G07F 17/32* (2006.01)

(52) U.S. Cl.
CPC ...... *G07F 17/3225* (2013.01); *G07F 17/3244* (2013.01)

(58) Field of Classification Search
CPC ............... G07F 17/3288; G07F 17/323; G07F 17/3244; G07F 17/3225; G06Q 50/34
See application file for complete search history.

(56) References Cited

U.S. PATENT DOCUMENTS 7,243,184 B1 * 7/2007 Ferguson ............ H04L 49/9094 711/216
2006/0045090 A1 * 3/2006 Ronciak .................. H04L 49/90 370/235
2009/0298575 A1 * 12/2009 Hopkins ............... H04L 51/214 463/43
2012/0058815 A1 * 3/2012 Ivanov .................... G07F 17/32 463/25
2012/0214575 A1 * 8/2012 Amaitis ................. G06Q 50/34 463/25

(Continued)

OTHER PUBLICATIONS

U.S. Appl. No. 18/087,507, Non-final Office Action, Jan. 17, 2025.

(Continued)

*Primary Examiner* — Chase E Leichliter
(74) *Attorney, Agent, or Firm* — Wash Park IP Ltd.; John T. Kennedy

(57) ABSTRACT

Message driven gaming systems and processes are described. For an implementation, a process may include executing, by a processor in a front-end server for a message driven gaming system, non-transient computer instructions which instantiate a producer engine. The message driven gaming system may include at least one back-end server. The producer engine configures the front-end server to communicate messages to the at least back-end server by: receiving first data corresponding to an online bet; generating, based on the first data, a first on-line gaming message; and publishing the first on-line gaming message onto a first message data stream. The back-end server periodically polls the first message data stream, and determines that the first on-line gaming message is available on the first message data stream for consumption by the back-end server. The message may include a settlement message for a bet placed by a user of the on-line gaming system.

5 Claims, 4 Drawing Sheets

(56) References Cited

U.S. PATENT DOCUMENTS

| | | | | |
|---|---|---|---|---|
| 2013/0029759 | A1* | 1/2013 | Sene | G07F 17/3288 463/28 |
| 2016/0110953 | A1* | 4/2016 | Sotiriou | G07F 17/3227 463/25 |
| 2017/0140611 | A1 | 5/2017 | Marantelli | |
| 2018/0033240 | A1* | 2/2018 | Mahasuverachai | G07F 17/3218 |
| 2021/0350669 | A1 | 11/2021 | Marantelli | |
| 2022/0028224 | A1 | 1/2022 | Proskey et al. | |
| 2022/0114856 | A1 | 4/2022 | Gold | |
| 2023/0124722 | A1 | 4/2023 | Polson et al. | |
| 2023/0360485 | A1 | 11/2023 | Winston et al. | |
| 2024/0212432 | A1* | 6/2024 | Lysaght | G07F 17/3244 |
| 2024/0212439 | A1* | 6/2024 | Creaner | G07F 17/3288 |

OTHER PUBLICATIONS

U.S. Appl. No. 18/087,507, Non-final Office Action Response, Mar. 31, 2025.

* cited by examiner

MESSAGE DRIVEN GAMING SYSTEMS AND PROCESSES

CROSS-REFERENCE TO RELATED APPLICATION

This application is related to U.S. patent application Ser. No. 18/087,507, which was co-filed herewith on 22 Dec. 2022, in the name of inventors John Creaner, Ozan Gursoy, Dhruv Ishpuniani, Victor Masutani and Oleg Gelman, entitled “Bet Placement”, the entire contents of which are incorporated herein by reference.

TECHNICAL FIELD

The technology described herein generally relates to devices, systems, and processes for communicating data packets between front-end server and back-end servers utilized to facilitate online gaming.

BACKGROUND

Online gaming systems commonly utilize a combination of one or more front-end servers and one or more back-end servers. The front-end servers commonly facilitate betting on one or more “events.” As used herein, an “event” is an occurrence upon which a bet may be placed. Non-limiting examples of “events” include sporting contests, political campaigns, social media events, and the like. The front-end server(s) commonly identify an event (e.g., a sporting game or otherwise) with respect to which bets are being accepted, generate odds for the event, track the event as it progresses, receive bets, confirm bet placement, resolve bets (e.g., determine whether an event result is consistent with, contrary to, or otherwise with respect to a given one or more bet(s)), communicate bet settlement results to users, and the like. Multiple front-end servers may be coupled for large events, such as the SUPER BOWL. The back-end servers commonly facilitate accounting, compliance, user verification, and similar function. Multiple back-end servers may be coupled.

The front-end servers and back-end servers are communicatively coupled using networks, such as the Internet and others. Such communications are often accomplished using the hyper-text transfer protocol (HTTP), whereby a data packet is pushed to a receiving server and an acknowledgement receipt message thereof is returned. The acknowledgement receipt verifying successful transmission of the data packet to the receiving server. If the acknowledgement receipt message is not received within a given time period, the data packet will typically be retransmitted. When the networks, servers or other system components become inoperable, saturated, deteriorated, or otherwise operate in a limited and/or reduced capacity, the sending and receiving of a data packet and an acknowledgement receipt message may be delayed, dropped, or otherwise non-timely communicated. These disruptions may result in one or more of the back-end systems and front-end systems having to resend one or more such data packets or acknowledgement receipts, and result in further network congestion and/or utilization of system processing resources—often resulting in an increase in both the quantity of messages communicated and the order/sequencing in which two or more data packets are communicated. These delays and non-sequential processing of data packets also often result in further processing and communications delays by front-end and back-end servers. Given the time-sensitive and sequence sensitive nature of the data packets communicated for online gaming systems current approaches are inefficient. Accordingly, a need exists for systems and processes for online gaming systems which address these and other needs.

SUMMARY

Various implementations are described of devices, systems, and processes for event driven gaming systems and processes.

In accordance with at least one implementation of the present disclosure a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

For a first process implementation, a process may include: executing, by a processor in a front-end server for a message driven gaming system, non-transient computer instructions which instantiate a producer engine. The message driven gaming system may include at least one back-end server. The producer engine configures the front-end server to communicate messages to the at least back-end server by: receiving first data corresponding to an online bet; generating, based on the first data, a first online gaming message; publishing the first online gaming message onto a first message data stream. The back-end server periodically determines whether the online gaming message is available, as a new message, on the first message data stream for consumption by the back-end server. Other implementations may include corresponding computer systems, apparatus, and computer programs recorded on one or more computer storage devices, each configured to perform the actions of the first process implementation.

For the first process implementation, the first online gaming message may include a settlement message for a bet placed by a user of the online gaming system. For at least one implementation, the process may include: removing the first online gaming message from the first message data stream upon at least one of: an elapsing of a time period; receipt by the front-end server from the back-end server of an indication that the first online gaming message has been consumed; and receipt by the front-end server from the back-end server of another indication that the first online gaming message has been consumed and processed.

For the first process implementation, the process may include: second receiving second data corresponding to at least one of the online bet and the first online gaming message; second generating, based on the second data, a second online gaming message; where the second online gaming message may be a boost message; and where the boost message provides an adjustment to an amount specified by the settlement message to be paid to the user; publishing the second online gaming message on the first message data stream; and whereby the back-end server, periodically polls the first message stream and determines that the second online gaming message may be available on the first message data stream for consumption by the back-end server.

For the first process implementation, the first online gaming message may include, in data fields, data specifying a user ID, an operation ID, a merchant ID, an amount, a bet ID, and an event status. The publishing of the first online gaming message onto the first message data stream further may include: identifying, based on the data in the data fields, a first topic in the first online gaming message; and selecting the first message data stream from a plurality of message data streams based on the first topic.

For the first process implementation, the publishing of the first online gaming message onto the first message data stream further may include: second identifying, based on the data in the data fields, a key in the first online gaming message; third identifying a first partition of the first message data stream corresponding to the key; and publishing the first online gaming message onto the first partition.

For the first process implementation, the topic may correspond to a jurisdiction; and the key may correspond to a user ID. Implementations of the described techniques may include hardware, a method or process, or computer software on a computer-accessible medium.

For at least one second process implementation, a process may include: executing, by a processor in a back-end server for an online gaming system, non-transient computer instructions which instantiate a consumer engine. The consumer engine instructs the back-end server to consume a first online gaming message published onto a first message data stream by a front-end server, by: periodically polling the first message data stream to determine whether the front-end server has published the first online gaming message onto the first message data stream; identifying a first classification for the consumer engine; determining a second classification for the first online gaming message; determining whether the first classification matches the second classification; designating, when the first classification matches the second classification, the first online gaming message for processing by a given back-end system server; and providing the first online gaming message to the given back-end system server for processing. Other implementations may include corresponding computer systems, apparatus, and computer programs recorded on one or more computer storage devices, each configured to perform the actions of the at least one second process implementation.

For the at least one second process implementation, the first online gaming message further may include a settlement message for a bet placed by a user of the online gaming system.

For the at least one second process implementation, the periodic polling further may include determining whether the front-end server has published a second online gaming message onto the first message data stream; determining a third classification for the second online gaming message; determining whether the first classification matches the third classification; when the first classification matches the third classification, designating the second online gaming message for processing by the given back-end system server; determining whether a time-ordered relationship exists between the second online gaming message and the first online gaming message; and when the time ordered relationship exists, delaying processing of the second online gaming message until after processing of the first online gaming message may be completed.

For the at least one second process implementation, the first online gaming message may be a settlement message for a bet placed by a user of the online gaming system; the second online gaming message may be a boost message; and the boost message provides an adjustment to an amount specified by the settlement message to be paid to the user.

For the at least one second process implementation, the first online gaming message may include, in first data fields, data specifying a user ID, an operation ID, a merchant ID, an amount, a bet ID, and an event status; and the second online gaming message may include, in second data fields, data specifying the user ID, the operation ID, the merchant ID, the bet ID, and a boost ID. Implementations of the described techniques may include hardware, a method or process, or computer software on a computer-accessible medium.

For at least one system implementation, a system may include: a front-end server; and a back-end server. The front-end server may include: a first processor; and a first data store, coupled to the first processor, storing first non-transient computer instructions. The first non-transient computer instructions, when executed, instantiate a producer engine. The front-end server may also include a first communications interface coupling the front-end server with the back-end server. The producer engine instructs the front-end server to perform producer engine operations that may include: receiving first data corresponding to an online bet; generating, based on the first data, a first online gaming message; and publishing the first online gaming message onto a first message data stream. The back-end server may include: a second processor; a second data store, coupled to the second processor, storing second non-transient computer instructions which, when executed, instantiate a consumer engine; and a second communications interface further coupling the back-end server with the front-end server. The consumer engine instructs the back-end server to perform consumer engine operations that may include: periodically polling the first message data stream for new messages; identifying the first online gaming message has been published onto the first message data stream; identifying a first classification for the consumer engine; determining a second classification for the first online gaming message; determining whether the first classification matches the second classification; and, when the first classification matches the second classification, designating the first online gaming message for processing by a given back-end system server; and providing the first online gaming message to the given back-end system server. Other implementations may include corresponding computer systems, apparatus, and computer programs recorded on one or more computer storage devices, each configured to perform the actions of the processes.

For the at least one system implementation, the first online gaming message may include a settlement message for a bet placed by a user of the online gaming system. For at least one implementation, the producer engine operations further may include: removing the first online gaming message from the first message data stream upon at least one of: an elapsing of a time period; receipt by the front-end server from the back-end server of an indication that the first online gaming message has been consumed; and receipt by the front-end server from the back-end server of another indication that the first online gaming message has been consumed and processed.

For the at least one system implementation, the producer engine operations further may include: second receiving second data corresponding to at least one of the online bet and the first online gaming message; and second generating, based on the second data, a second online gaming message. The second online gaming message may be a boost message. The boost message may provide an adjustment to an amount specified by the settlement message to be paid to the user. The operations further may include publishing the second online gaming message on the first message data stream.

For the at least one system implementation, the first online gaming message may include, in first data fields, data specifying a user ID, an operation ID, a merchant ID, an amount, a bet ID, and an event status. The second online gaming message may include, in second data fields, data specifying the user ID, the operation ID, the merchant ID, the bet ID, and a boost ID. For at least one implementation, the publishing of the first online gaming message onto the first message data stream further may include: identifying, based on the data in the first data fields, a first topic in the first online gaming message; and selecting the first message data stream from a plurality of message data streams based on the first topic.

For the at least one system implementation, the publishing of the first online gaming message onto the first message data stream further may include: second identifying, based on the data in the first data fields, a key in the first online gaming message; third identifying a first partition of the first message data stream corresponding to the key; and publishing the first online gaming message onto the first partition. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
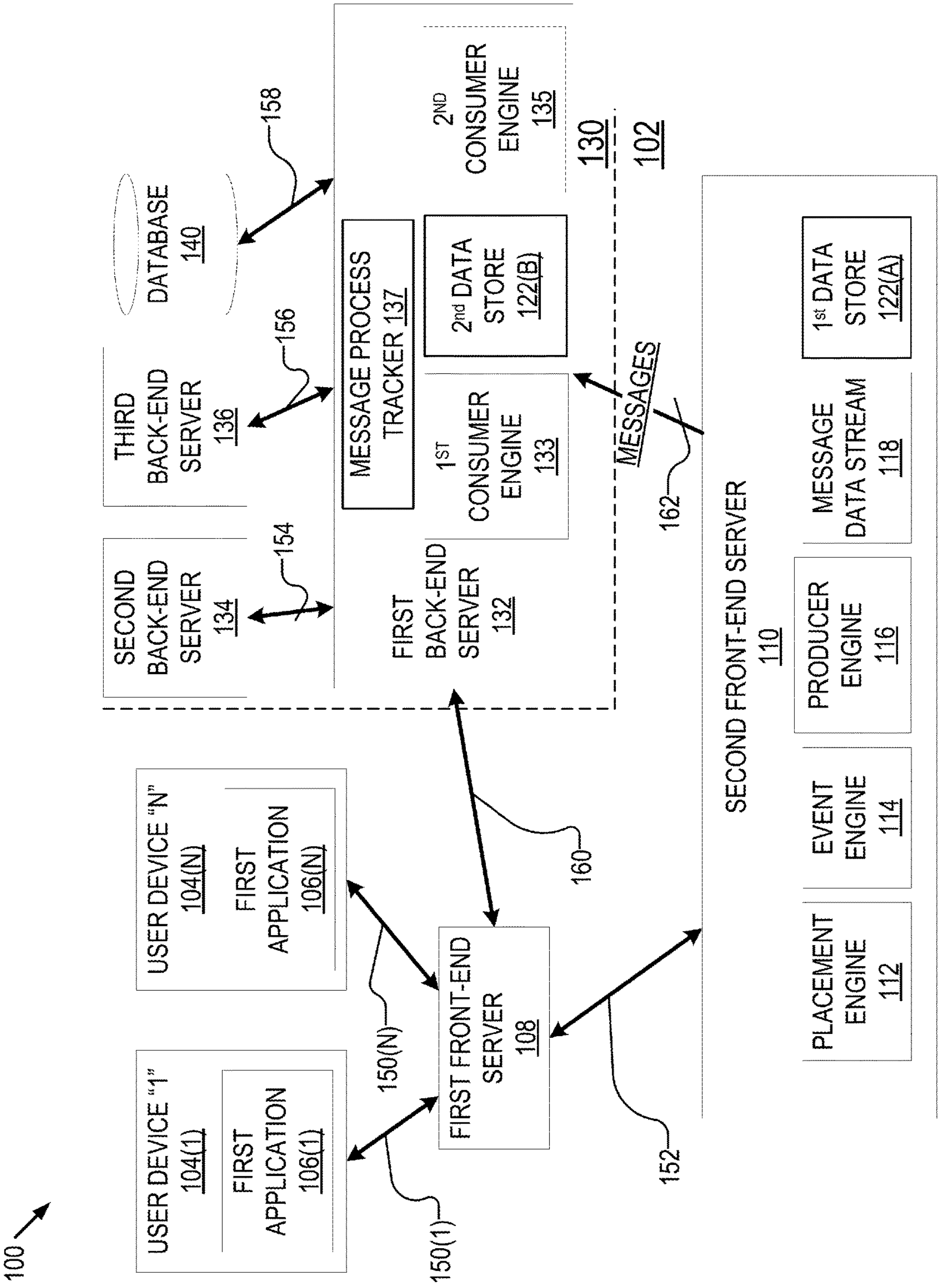
FIG. 1 is a schematic illustration of an event driven gaming system and in accordance with at least one implementation of the present disclosure.

Various implementations of the present disclosure describe devices, systems, and processes for event driven gaming systems and processes.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals"). An AIO signal may not include an audible signal or a visible signal but may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI generally includes hardware and computer instructions (herein, "AIO technologies") which supports the input and output of other signals with a user.

"Application" herein refers to a set of computer instructions that configure one or more processors perform one or more tasks that are other than tasks commonly associated with the operation of the processor itself (e.g., a "system software," an example being an operating system software), or the providing one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface generally includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize and capture comments spoken by a user and intended as audible signals for sharing with other users, inputting commands, or otherwise.

"Back-end system" (BES) herein refers to one or more computer servers, data storage devices, applications, and the like which, singularly and/or cooperatively, address one or more back-end online gaming functions. As used herein, a "back-end online gaming function" (BEOGF) is one or more data processing operations and communications operations performed by one or more servers which facilitate one or more of user verification, regulatory compliance, accounting, and the like. A back-end system may include one or more servers, data stores, communications interfaces, user interfaces, security, power, busses, and related components. The back-end system components may be physically, logically, virtually or otherwise grouped and/or coupled to facilitate the one or more back-end online gaming functions including, but not limited to, those identified herein.

"Bus" herein refers to any known and/or later arising technologies which facilitate the transfer of data within and/or between devices. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for many users and/or uses), hybrid, dedicated, non-dedicated, or otherwise. It is to be appreciated that implementations of the present disclosure may use Cloud resources to provide for processing, storage and other functions related to facilitating bet settlement. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), the KAFKA protocol, as provided by the Apache Software Foundation and as further described at https://kafka.apache.org/documentation/#introduction (the contents of which are incorporated herein by reference), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Content" herein refers to data that may be presented, using a suitable presentation device, to a user in a humanly perceptible format. When presented to a human, the data becomes "information." Non-limiting examples of content include gaming images and graphics such as those related to bet placement, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized.

"Coupling" herein refers to establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), VOIP, Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" (which is also referred to herein as a "computer data") herein refers to any representation of facts, information or concepts in a form suitable for processing, storage or the like by one or more electronic device processors, data stores or the like. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in memory, data storage device, or otherwise, the given data packet may again have a non-transient state. For example, and not by limitation, data may take any form including as one or more applications, content, or otherwise.

"Data store" herein refers to any device or combinations of devices configured to store data on a temporary, permanent, transient, non-transient, or other basis. A data store may store data in any form, such as electrically, magnetically, physically, or otherwise. A data store may include a memory devices, with non-limiting examples including random access memory (RAM) and read only memory (ROM) devices. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising memory and data storage device technologies may be utilized for a given data store. Available storage provided by a given one or more data stores may be partitioned or otherwise designated by the storage controller as providing for permanent storage and temporary storage. Non-transient data, computer instructions, or other the like may be suitably stored in a data store. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient data and content.

"Delay" herein refers to a period of time after a first event before a second event occurs. For a non-limiting example, a delay may occur between an outputting of a bet settlement data packet by a back-end system and a receipt of the bet settlement data packet by a client centric system. A delay may occur for a pre-determined, dynamically determined, or otherwise determined length of time. A delay may be quantified using any metric, such as transmission time, presentation time, received versus sent time, latency, or otherwise.

For at least one implementation, an "acceptable delay" is a delay of less than a given metric, for example and not by limitation, four seconds (4 s) under normal load conditions and twenty seconds (20 s) under heavy load conditions. For example, a delay between an outputting of a given bet settlement data packet by a back-end system element and a receipt of the given bet settlement data packet by a client centric system element may be an acceptable delay if less than four seconds (4 s) during a normal load condition, e.g., during a weekly PREMIER LEAGUE™ football match, a U.S. NFL™ game or the like, while a delay of twenty seconds (20 s) may be an acceptable delay under heavy load conditions, e.g., during a SUPER BOWL™ game, the WORLD CUP™ finals, or the like. Accordingly, it is to be appreciated that an acceptable delay may vary based on current system load conditions.

For at least one implementation, a given delay may be determined based on a quantification of one or more networked communications characteristics occurring between a back-end system element and a front-end system element. It is to be appreciated that such one or more networked communications characteristics may vary over time and with use thereof.

"Device" and "electronic device" herein refer to any known or later arising electrical device configured to, singularly and/or in combination, communicate, manipulate, output for presentation as information to a human, process, store, or otherwise utilize data. Non-limiting examples of devices include user devices and servers.

"Front-end system" (FES) herein refers to one or more user devices, servers, data storage, communications interfaces, and related components which, singularly and/or cooperatively, address one or more front-end online gaming functions. As used herein, a "front-end online gaming function" (FEOGF) is one or more data processing and/or communications operations performed by one or more user devices and/or servers which facilitate one or more of event identification, odds making, bet placement, event tracking, event settlement, and the like. A front-end system may include one or more user devices, servers, data stores, communications interfaces, user interfaces, busses, and related components. The front-end system components may be physically, logically, virtually or otherwise grouped and/or coupled to facilitate the one or more front-end online gaming functions including, but not limited to, those identified herein.

"Instruction" (which is also referred to herein as a "computer instruction") herein refers to a non-transient processor executable instruction, associated data structure, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used and a given module may include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the use of electrical energy by a device. Non-limiting examples of such technologies include batteries, power converters, inductive charging components, line-power components, solar power components, and otherwise.

"Processor" herein refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, micro-controllers; and the like. Processors may be implemented in single or parallel or other implementation structures, including distributed, Cloud based, and otherwise.

"Real-time" herein refers to a presentation of information to a human that occurs substantially simultaneously with a resolution of an event, such as an activity with respect to which a bet has been placed.

"Security Component/Security" herein refers to any known or later arising processor, computer instruction, and/or combination thereof configured to secure data as communicated, processed, stored, or otherwise manipulated. Non-limiting examples of security components include those implement encryption standards, such as an Advanced Encryption Standard (AES), transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include database servers, file servers, application servers, web servers, communications servers, virtual servers, computing servers, and the like. Servers may be combined into clusters (e.g., a server farm), logically or geographically grouped, or otherwise. Any known or later arising technologies may be used for a server.

A server may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Substantially simultaneous(ly)" herein refers to an absence of a greater than expected and humanly perceptible delay between a first event or condition, such as a completion of a gaming activity, and a second event or condition, such as a presentation of a bet settlement for a bet placed with respect to the gaming activity. Substantial simultaneity may vary in a range of quickest to slowest expected delay, to a moderate delay, or to a longer delay. For at least one implementation, substantial simultaneity occurs within an acceptable delay (as described above).

"User Device" herein refers to a device configured for use by a human being to one or more of communicate, present, process, and store data. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface generally includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Message Driven Gaming System 100

As shown in FIG. 1 and for at least one implementation of the present disclosure, a message driven gaming system, a system 100, may include a front-end system (FES) 102 and a back-end system (BES) 130. The system 100 may be configured to communicate online gaming messages (herein, also referred to as being a "message") by the FES 102 to the BES 130 using at least one data stream. As described below, the FES 102 publishes the one or more online gaming messages onto a message data stream. The BES 130 periodically polls the message data stream for new messages that have been published thereon. The BES 130 may then retrieve the online gaming messages on an as-needed basis and independent of the FES 102. The online gaming messages may be deleted from the message data stream based upon an elapse of time, upon retrieval by the BES 130, upon user prompt, or otherwise.

The FES 102 may include one or more user devices 104, such as first user device 104(1) and an Nth user device 104(N), a first front-end server (1FES) 108, and a second front-end server (2FES) 110. The BES 130 may include a first-back end server (1BES) 132, a second back-end server (2BES) 134, a third back-end server (3BES) 136, and a database 140.

The various system elements may be coupled using one or more couplings. For at least one implementation, the one or more user devices 104 may be coupled, by respective first couplings 150 (as shown, couplings 150(1) and 150(N)) to the 1FESs 108. The 1FES 108 may be coupled to the 2FES 110 by a second coupling 152. The 1BES 132 and 2BES 134 may be coupled by a third coupling 154. The 1BES 132 and 3BES 136 may be coupled by a fourth coupling 156. The 1BES 132 and database 140 may be coupled by a fifth coupling 158. Other couplings may be used for other implementations. The FES 102 and BES 130 components may be coupled by a sixth coupling 160 coupling the 1FES 108 with the 1BES 132, and a seventh coupling 162, coupling the 2FES 110 with the 1BES 132.

User Device 104

For at least one implementation, the system 100 may include one or more user devices 104. A user device 104 may include one or more device components including, but not limited to, a processor, a data store, a user interface, a communications interface, a power supply, a security component, and other components. The one or more components may be provided with the device or elsewhere, e.g., a remote data store accessible to the device by one or more couplings may be used.

The user device 104 may be configured to execute a first application 106. For at least one implementation, the first application 106 may be an online gaming application which facilitates a user's review, selection and input of one or more online gaming bets for one or more events, information regarding the status and final resolution of the events or elements thereof, and settlement of bets placed relative to such events and/or elements thereof.

For a non-limiting example, an event may be a given currently occurring or future occurring NFL™ game, e.g., the New England Patriots vs the Kansas City Chiefs. A betting option for the event may be a final score, a winner, a loser, or the like. An element of the event may be a performance metric for one or more players (e.g., a quarterback passing for over three-hundred (300) yards). Any event and/or element(s) thereof may be a subject of one or more online gaming bets. As the event progresses, the first application 106 for the given user may provide updates on existing bets, new betting options, odds adjustments, and the like with respect to the event and/or elements thereof. When the event or element thereof concludes, the first application 106 may provide the given user with updates on winnings/losses, or other information pertaining to the event or element thereof. The first application 106 may be configured to provide, for presentation to a user, any information relevant to a given bet, betting event, element thereof, settlement of the bet, or the like.

1FES 108

For at least one implementation, the system 100 may include a 1FES 108. The 1FES 108 may be implemented as a server, with a non-limiting example of a server being shown in FIG. 2.

Figure 2:
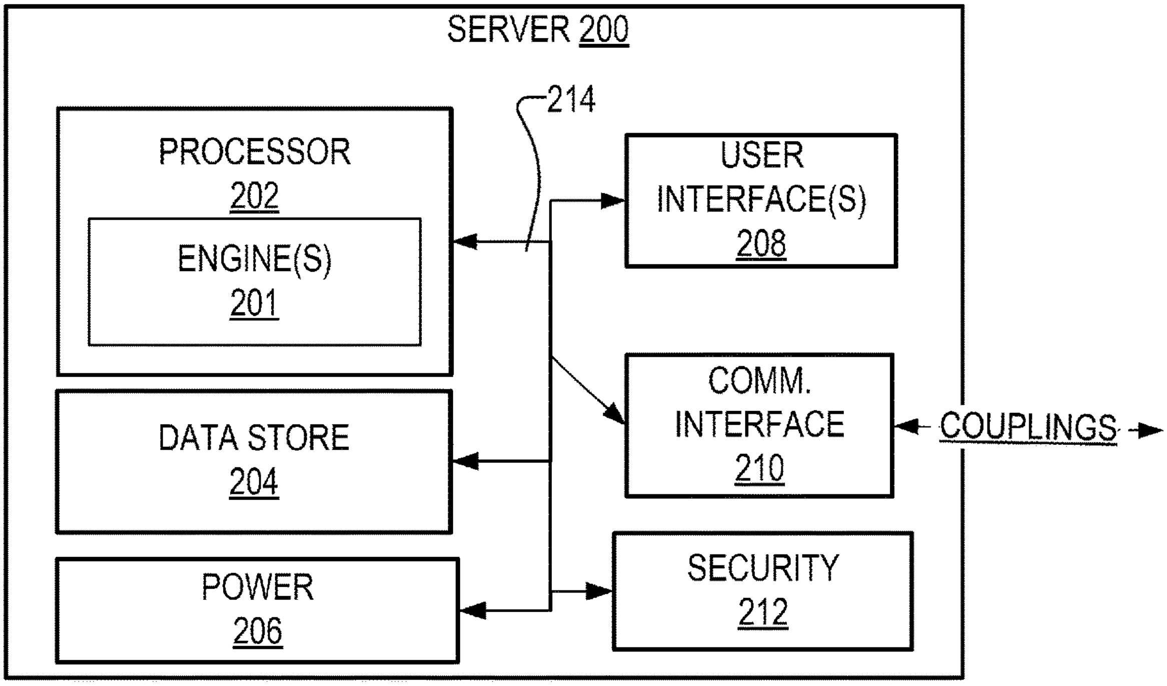
FIG. 2 is a schematic for a server and in accordance with at least one implementation of the present disclosure.

As shown in FIG. 2, a server 200 may include a processor 202 which executes non-transient computer instructions stored in the data store 204 for executing applications, instantiating one more computer engines 203, and performing other device related operations. The computer engines 201 instruct the server and/or other system 100 components to perform various operations which facilitate (among other operations) processing, communication, storage and the like of settlement messages between system 100 components, such as between the FES 102 and the BES 130. For at least one implementation, computer engines 201 may also be utilized to facilitate communication of messages between the FES 102 and the BES 130. Communication of data between a server 200 and another system 100 component may utilize a communications interface 210 that respectively couples the given server with the other system component (s). The server 200 may further include one or more user interfaces 208, power supply 206, security component 212, and other commonly utilized components for one or more computers and/or computer servers. The server components may be communicatively coupled, by a bus 214.

Any number of 1FESs 108 may be used for a given implementation of the present disclosure with one 1FES 108 being shown in FIG. 1 for purposes of clarity of this description. For at least one implementation, the 1FES 108 may be a proxy server, a load-balancing server, a web server, or the like. The 1FES 108 may be a wager server that is configured to present one or more online gaming betting options to a first application 106 executing on a user device 104, receive one or more bets from the user device 104, and provide data regarding updates to betting events or elements thereof, a settlement of a previously placed and/or on-going bets, and the like. For at least one implementation and as viewed from the perspective of a user device 104, communications between the user device 104 (and the first application 106) are with the 1FES 108, with other communications and data processing operations for the system 100 occurring by the 2FES 110 ad BES 130 elements.

2FES 110

For at least one implementation, the system 100 may include a 2FES 110. The 2FES 110 may be a server 200 and may include at least one or more of the components shown in FIG. 2. One or more of the components and/or features and functions facilitated by the 1FES 108 and the 2FES 110 may be logically and/or physically separate, combined, virtualized, distributed, or otherwise arranged for a given implementation of the present disclosure.

For at least one implementation, the 2FES 110 may be configured to manage aspects of event identification, odds generation, bet placement, bet settlement, message generation, message communication, and the like. For at least one non-limiting example, the 2FES 110 may be configured to execute one or more computer engines with non-limiting examples including: a placement engine 112 which may be configured to receive and process bet placements from one or more users; an event engine 114, which may be configured to track the status of events and elements thereof, adjust odds, and provide data regarding event/element updates and the like; a producer engine 116, which is further described below and may be configured to generate online gaming messages which provide data regarding settlement of a given bet and/or a "boost" thereto. As used herein, a "boost" refers to an adjustment to one or more items of consideration related to one or more settled bets for one or more events and/or elements thereof. For a non-limiting example, a boost may be a multiplier by which a settlement amount for a given bet, for one or more events, is increased or decreased. For another non-limiting example, a boost may be a grant of a second consideration, such as an awarding of rights in non-fungible tokens (NFTs), or the like, in view of a settled bet, an event condition, a random selection, or otherwise.

1BES 132

For at least one implementation, the system 100 may include a 1BES 132. The 1FES 132 may be a server 200 (as described above and as shown in FIG. 2). The 1BES 132 may be configured to execute one or more non-transient computer instructions which instantiate a first consumer engine 133 and, when utilized for a given implementation, one or more second consumer engines 135. For at least one implementation, a first consumer engine 133 may be utilized. For other implementations, two or more consumer engines may be implemented. The first consumer engine 133 and one or more second consumer engines 135 are collectively described hereinbelow.

2BES 134

For at least one implementation, the system 100 may include a 2BES 134. The 2BES 134 may be a server (as described above and as shown in FIG. 2). The 2BES 134 may be configured to execute non-transient computer instructions which facilitate user verification and related functions. User verification may include operations including, but not limited to, receiving user information, such as name, address, age, citizenship, residency, banking information, and the like. User verification may further include verifying whether a given user is eligible or otherwise permitted to place a given bet, whether the given user has funds and/or access to financial capital to cover the given bet, and the like.

3BES 136

For at least one implementation, the system 100 may include a 3BES 136. The 3BES 136 may be a server (as described above and as shown in FIG. 2). The 3BES 136 may be configured to execute non-transient computer instructions which facilitate account management and other accounting related features and functions. Non-limiting examples of account management operations may include debiting accounts based upon placed bets, placing reserves on account balances in view of unresolved bets, crediting accounts based on settled bets, advancing lines of credit to an account owner, and otherwise.

To facilitate online gaming system communications, for at least one implementation, the 1BES 132 may be configured to utilize HTTP and similar protocols for bet placement, reserve placement and other communications, while using a producer-consumer model to process bet settlement, bet boosts, resettlements, and other communications pertaining to the crediting of accounts for one or more users. For at least one implementation, the 3BES 136 may be configured to inform the 1BES 132 when it is capable of receiving and processing an online gaming message. Upon which instance, the 1BES 132 may retrieve/consume a next message, published by the FES 102, onto a given message data stream.

One or more of the features and functions provided by 1BES 132, the 2BES 136 and the 3BES 138 may be provided by a single server or a combination of two or more servers.

Database 140

The Database 140 may be configured as a data store which stores online gaming messages, including settlement messages, boost messages and resettlements, account data, and other data. The Database 140 may include one or more portions of a message data stream 118, as described further herein. The database 140 may be accessible by one or more of the system 100 components via the Cloud or other couplings.

Producer Engine 116 and Consumer Engine 133

For at least one implementation, the system 100 may include one or more producer engines 116, performing producer engine operations, which generate online gaming messages and publish such messages into a message data stream. For at least one implementation, one or more producer engines 116 may be instantiated by one or more FES 102 servers, such as the 2FES 110.

For at least one implementation, the system 100 may include one more consumer engines (such as first consumer engine 133 and one or more second consumer engines 135), performing consumer engine operations, which are configured to retrieve/"consume" message published onto the message data stream and provide the retrieved message(s) to one or more BES 130 servers, database 140, or other system 100 component for processing, storage, or the like. For at least one implementation, the one more consumer engines may be instantiated by one or more 1BESs 132. The producer engine(s) and consumer engine(s) may be configured to facilitate communication of settlement messages between the 2FES 110 to the 1BES 132.

As shown, a first consumer engine 133 and one or more second consumer engines 135 may be utilized in an implementation of the present disclosure. Unless otherwise specified herein, a reference to the first consumer engine 133 includes a reference to any second consumer engines 135 utilized in a given implementation.

For at least one implementation, the producer engine 116 may be configured to instantiate a first data store 122(A), in which messages may be stored on a temporary or other basis. Contents of the first data store 122(A) may be replicated into one or more second data stores 122(B). As shown for illustration purposes, the second data store 122(B) may be hosted by the 1BES 132 or other system 100 components. Multiple instantiations of producer engines and/or consumer engines may be utilized in an implementation of the present disclosure.

For at least one implementation, the first consumer engine 133 may pull one or more messages published in the message data stream 118. Such messages may be stored in the first data store 122(A). The first consumer engine 133 may suitably store the retrieved message(s) in a second data store 122(B), provide the retrieved message(s) to the 3BES 136, store the retrieved messages in the Database 140, or otherwise store, process, further communicate, or manage the retrieved message(s).

For at least one implementation, the producer engine 116 and first consumer engine 133 may be configured into a respective producer and consumer relationship. For example, the producer engine 116 may be configured to publish messages to the message data stream 118. Contents (e.g., messages) identified in the message data stream 118 may be stored in the first data store 122(A) or otherwise stored for retrieval by the first consumer engine 133. The producer engine 116 may send a notice to the first consumer engine 133 that a new message has been published into the message data stream 118.

The first consumer engine 133 may be configured to receive notices of messages being published into the message data stream 118 and retrieve the as messages identified in the message data stream 118. For at least one implementation, the retrieval of the published messages by the first consumer engine 133 may occur at any time, and under any conditions and/or constraints specified by the first consumer engine 133, by the 3BES 136, or otherwise.

For example, and not by limitation, retrievals of one or more messages identified in the message data stream 118, by the first consumer engine 133 from the message data stream 118 itself or a data store, such as the first data store 122(A), may occur on a first-in/first-out basis, in batch, based on one or more designators in a message, such as by user, bet type, event, event element, or otherwise. For at least one implementation, retrievals of messages identified in the message data stream 118 may occur in a time ordered sequence to prevent resettlements of settlements previously applied to a given user account. Herein, a "resettlement" is an adjustment to a user's account in view of later arising information affecting at least one bet and/or bet settlement. A resettlement may, e.g., result in an increase or a decrease of an account balance for a given use.

For at least one implementation, the first consumer engine 133 may be configured to retrieve one or more settlement messages identified in the message data stream 118 based upon one or more system constraints and/or conditions, including based on one or more BES 130 constraints or conditions, one or more first through fourth coupling constraints and conditions, and otherwise. The messages identified in the message data stream 118 may be stored in the first data store 122(A) by the 2FES 110, and/or (when retrieved) in the second data store 122(B), for a given period including indefinitely, or otherwise.

For at least one implementation, the producer engine 116 and may be configured to respectively publish one or more "boost messages" into the message data stream 118 and the first consumer engine 133, may be configured to consume such boost messages. Herein, a boost message identifies a boost to be applied to a given online gaming message, such as a settlement message, or the like. For at least one implementation, a boost message may be published into a boost data stream (not shown) that is separate from the message data stream 118. For example, and within a given message data stream 118, a settlement message may be followed (in a time ordered or other sequence) by a boost message, with the boost message adjusting ("boosting") an amount specified (e.g., by a debit or a credit) in one or more settlement messages. As used herein, a "message" commonly refers to one of a settlement message, a boost message, or any other communication between a FES 102 component and a BES 130 component wherein such communication is to occur in an publish and consumer or similar ordered manner.

KAFKA Implementation

For at least one implementation, the producer engine 116 and first consumer engine 133 may be configured using KAFKA technologies with the first data store 122(A) and second data store 122(B) being configured as KAFKA brokers. Other KAFKA brokers may be provided by other system 100 components, as provided for a given implementation. When configured using KAFKA, the producer engine 116 may function as a KAFKA "producer" and the first consumer engine 133 may function as a KAFKA "consumer." A KAFKA producer writes events, e.g., the data provided in the messages, and a KAFKA consumer reads and/or otherwise retrieves and processes the written events. When using KAFKA, it is to be appreciated that operations performed by the producer engine 116 and the first consumer engine 133 are decoupled and may occur independently. For example, the producer engine 116 may write messages into the message data stream 118 independently of the retrieval of messages therefrom by the first consumer engine 133.

For at least one implementation, the producer engine 116 may be configured to write messages into one or more identifiable "topics." As used herein for at least one implementation, a KAFKA topic may be analogous to a folder in a file-folder storage architecture or other relational data structure. For at least one implementation, a message may be considered analogous to a file that is stored in a KAFKA topic (a folder), with the message being identifiable/indexable based upon its entry into the message data stream 118.

For at least one implementation, the producer engine 116 and first consumer engine 133 may utilize a KAFKA topic scheme. For at least one implementation, a single topic may be used for one or more jurisdictions, where a jurisdiction is a collection of one or more users, events, event elements, bets, or other the like. For at least one implementation, a jurisdiction may refer to a legal jurisdiction, such as one established by a sovereign, governmental, quasi-governmental, or other body. For another implementation, multiple KAFKA topics may be used for multiple jurisdictions and/or for other designations.

For at least one implementation, a topic may be delineated into one or more partitions. A partitions may exist based upon any given classification of messages. A partition may be associated with one or more keys. For at least one implementation, partitions (and keys associated therewith) may be provided on a user identifier basis, an event basis, or otherwise.

For example, a topic may correspond to an event, e.g., the SUPER BOWL. The topic may be further partitioned based on keys including, but not limited to, user ID, user location, event element, bet type, bet amount, or otherwise. A topic and the partition designated by the one or more keys may be utilized to organize message published onto one or more message data streams 118.

For at least one implementation, a topic may be designated for boost messages. Further, boost messages may be published in a given topic and partitioned using one or more keys, such as a user identifier, an account operation identifier, or otherwise.

The first consumer engine 133 may subscribe to the topics and/or partitions (as represented by the key(s)) and consume, from the message data stream 118, messages corresponding to the as subscribed topics and/or partitions.

By utilizing topics and partitions, a first consumer engine 133 may consumer messages from the message data stream 118 in an orderly basis, e.g., sequentially, at any time, and independently of operations which publish the message data stream 118 with new messages by the producer engine 116. Accordingly, it is to be appreciated that for at least one implementation message population and message consumption may occur agnostically. Messages may be received by the 1BES 132 in a time-ordered sequence, by independently pulling messages corresponding to a given topic and partition from the message data stream 118 in an as published order.

By delineating messages by topics and partitions, it is further to be appreciated that the functions of the producer engine 116 and/or first consumer engine 133 may be replicated such that multiple instantiations thereof may exist on one more servers which collectively provide the features and functions of the 2FES 110 and/or 1BES 132 and thereby facilitate parallel population, retrieval and/other communication and processing of messages. Accordingly, a scalable system for communicating messages from the FES 102 to the BES 130 may be provided.

For at least one implementation, messages identified in the message data stream 118 may be suitably stored until deleted, if ever deleted. Such deletion may occur based on an elapsing of time, user instruction, data storage overflow, on retrieval, or otherwise. For at least one implementation, messages identified in the message data stream 118, which may be published and replicated across the first data store 122(A), second data store 122(B), and otherwise, may be stored for at least seven (7) calendar days after being first published onto the message data stream 118.

Figure 3:
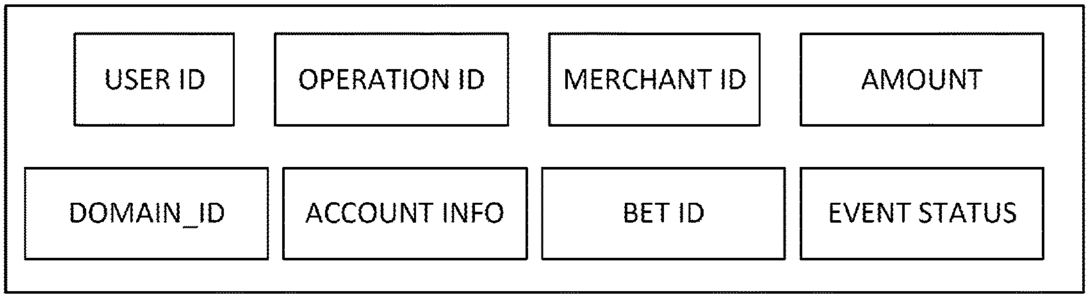
FIG. 3 illustrates data fields used in a settlement message and in accordance with at least one implementation of the present disclosure.

As shown in FIG. 3 and for at least one implementation, a settlement message may include data fields, in any given order and for any given length, for one or more of a: a user identifier (user ID), an operation ID, a correlation ID, a merchant ID, an amount field, a domain ID, account information, betting information, event status, and other data relating to a given settlement of a given bet or collection of bets.

Figure 4:
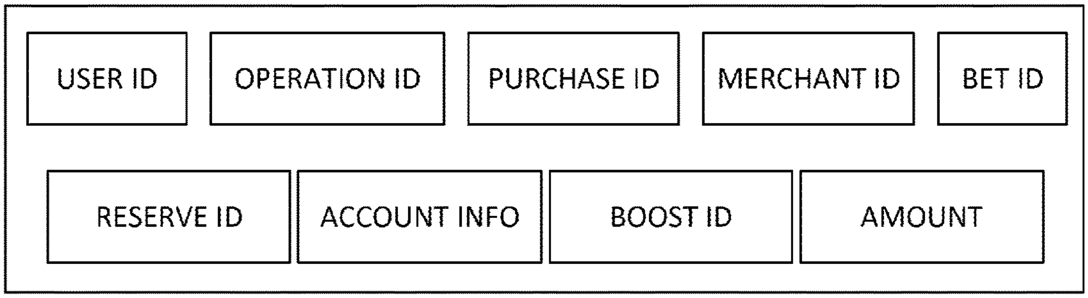
FIG. 4 illustrates data fields used in a boost message and in accordance with at least one implementation of the present disclosure.

As shown in FIG. 4 and for at least one implementation, a boost message may include data fields, in any given order and for any given length, for one or more of: a user ID, an operation ID, a purchase ID, a merchant ID, a bet ID, a reserve ID, account information, a boost ID, an amount field, and other data relating to a given boost. As shown and for at least one implementation, a boost message may include fewer data fields than a settlement message.

For at least one implementation, a message may be associated with a topic and/or one or more partitions based on data contained in the one or more message data fields. Such association is further referred to herein as "classification" of a message with the message being "classified"). For at least one implementation, a message may be classified based on a hashing of a user ID, one or more other message data fields, or the like.

For at least one implementation, a given first consumer engine 133 may be configured to identify which partitions to consume (e.g., based on a hashed user ID, a classification, or otherwise), be automatically assigned partitions to consume, or otherwise.

For at least one implementation, multiple consumer engines, such as the first consumer engine 133 and the second consumer engine 135 may be associated with or otherwise assigned to a consumer group. As used herein, a "consumer group" is a collection of consumer engines assigned to one or more classifications. For a non-limiting example, a consumer group may be designated at a first level based on a geography, example, the United States, and at a second level by an event type (e.g., an NFL game), and by a third level based on a given event (e.g., the Patriots vs Chiefs game), and the like.

For at least one implementation where multiple consumer engines may be assigned to a consumer group, and a given message may be consumed by a designated consumer engine in the consumer group and for a given classification, with other messages being consumed by the other consumer engine(s) for other classifications (or sub-classifications thereof).

For at least one implementation, where the first consumer engine 133 is utilized, the first consumer engine 133 may be automatically assigned to consume messages published into any classification. When a second consumer engine 135 is generated by a server in the BES 130, a rebalancing may occur. A ratio "X" of the currently existing classifications may be transferred to the second consumer engine 135. For at least one implementation, the ratio "X" equals fifty-percent (50%). Other percentages may be utilized for other implementations.

In another implementation, rebalancing may occur based upon one or more of the topics, partitions or otherwise associated with one or more classifications. For a non-limiting example, a rebalancing may occur based upon an event type, where consumption of messages for a popular event may be transferred to the second consumer engine 135 while messages for another event remain for sequential consumption by the first consumer engine 133.

It is to be appreciated that when a rebalancing occurs, consumption and processing of a given message may occur on both the existing (e.g., the first consumer engine 133) and on a newly added consumer engine (e.g., a second consumer engine 135). To avoid conflicts and redundant operations, the existing consumer engine may terminate processing of one or more messages during rebalancing.

Figure 5:
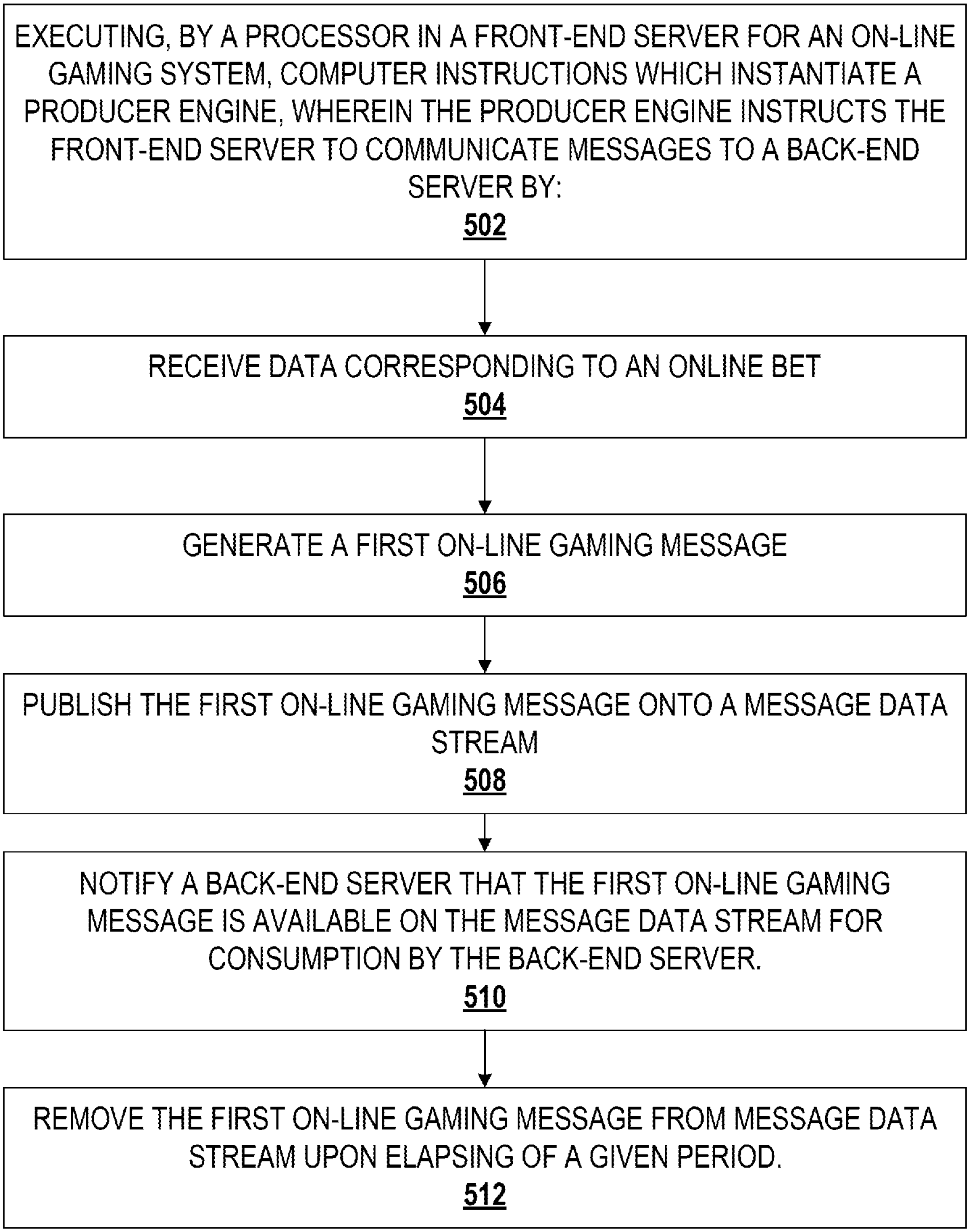
FIG. 5 is a flow chart illustrating one process for producing messages and in accordance with at least one implementation of the present disclosure.

As shown in FIG. 5, a process for producing messages and in accordance with at least one implementation of the present disclosure includes executing, by a processor in a front-end server (e.g., the 2FES 110), computer instructions which instantiate a producer engine 116, which instructs the front-end server to communicate messages to a back-end server by performing various operations. (Operation 502).

As shown by Operation 504, the process may include the producer engine receiving data corresponding to an online bet. For at least one implementation, the data may include the data fields shown in FIG. 3 and discussed above. The data may be received from one or more of the placement engine 112 and the event engine 114.

As shown by Operation 506, the process may include generating a first online gaming message based on the received data. The first online gaming message may include data corresponding to one more of the data fields shown in FIG. 3 and as discussed above.

As shown by Operation 508, the process may include publishing the first online gaming message onto a message data stream.

As shown by Operation 510, the process may include notifying a back-end server (e.g., the 1BES 132), that the first online gaming message is available on the message data stream for consumption by the back-end server.

Figure 6:
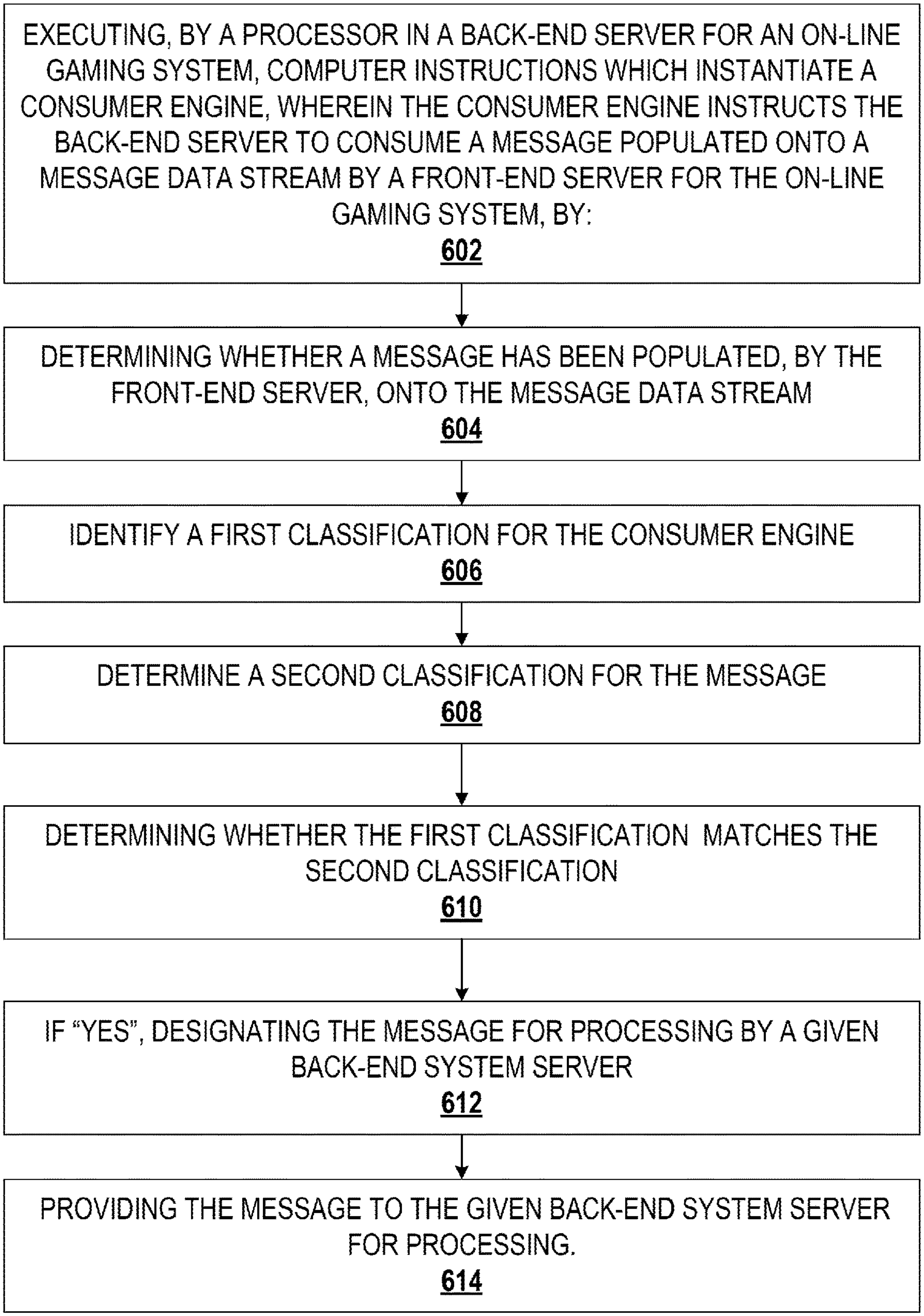
FIG. 6 is a flow chart illustrating a process for consuming messages and in accordance with at least one implementation of the present disclosure.

As shown in FIG. 6, a process for consuming an online gaming message and in accordance with at least one implementation of the present disclosure includes executing, by a processor in a back-end server for an online gaming system, computer instructions which instantiate a consumer engine, wherein the consumer engine instructs the back-end processor to consume a message published onto a message Data stream by a front-end server for the online gaming system, by performing various operations. (Operation 602.)

As shown by Operation 604, the process may include determining whether a message has been published, by the front-end server, onto the message data stream.

As shown by Operation 606, the process may include identifying a first classification for the consumer engine. As discussed above, the first classification may include all messages, messages delineated based on a topic, partition, message data field, combination of the foregoing, or otherwise.

As shown by Operation 608, the process may include determining a second classification for the message. As discussed above, for at least one implementation, the determining of a second classification for the message may include computing of a hash value based upon one more data fields specified for the message.

As shown by Operation 610, the process may include determining whether the first classification matches the second classification.

As shown by Operation 612, the process may include when the classifications match, designating the message for processing by a back-end system server.

As shown by Operation 614, the process may include providing the message to the given back-end system server for processing thereby. Such providing may include one or more of identifying to the given back-end system server a location in a data store from which the message can be retrieved, transferring the message from the consumer engine to the given back-end system server, combinations of the foregoing, or otherwise.

It is to be appreciated that the operations depicted in FIG. 6 are illustrative and are not intended herein to occur, for implementations of the present disclosure, in the order shown, in serial, or otherwise. One or more operations may be performed in parallel and operations may not be performed.

Message Process Tracker 137

For at least one implementation, a message process tracker 137 may be instantiated. As shown in FIG. 1, the message process tracker 137 may be instantiated by the 1BES 132. For other implementations, the message process tracker 137 may be instantiated by a 2BES 134, a 3BES 136, or other BES 130 component. The message process tracker 137 may coordinate consumption (by one or more consumer engines) and processing of messages. For at least one implementation, processing of a given message may occur by a "worker." The worker may be instantiated by a BES 130 server, such as (and not by limitation), a 2BES 134 or a 3BES 136.

For at least one implementation, the message process tracker 137 may verify whether a boost message and a related settlement message have been consumed and/or processed in an ordered sequence, such as where the settlement message is consumed and processed before the boost message. For at least one implementation, relationships between two or more messages may be determined based on a given value associated with the messages. The given value may be generated by the 1BES 132 as a hash value computed based on a combination of or more data fields used in a given messages, such as user ID, operation ID, and bet ID. When the given values match, the message process tracker 137 may delay consumption and/or processing, by a worker, of a boost message until an associated settlement message has been consumed and processed.

For at least one implementation, the message process tracker 137 may be configured to track successfully consumed and processed messages based on the given value for the message. The message process tracker 137 may publish a processed message list of given values that a worker (e.g., the 3BES 136) may access before processing a consumed message. The processed message list may be published to two or more instantiations of a second data store 122(B) utilized for a given implementation where multiple instantiations of the 1BES 132 are utilized. For at least one implementation, the processed message list may be stored in the database 140, and accessible to the workers utilized for a given implementation.

For at least one implementation, the message process tracker 137 may be configured to delay communication of bet payments to the FES 102 until related message have been consumed and processed by a worker. The 1BES 132 may identify bet payments that are to be delayed by verifying from the processed message list whether a given message is related to an unprocessed message. If so, the message process tracker 137 may periodically verify whether the related message has been processed and when so processed obtain current bet payment data from the worker and facilitate communication of the current bet payment data to the given user device 104 via the 1FES 108.

For at least one implementation, the message process tracker 137 may be configured to mark messages that cannot be consumed or processed for one or more reasons as failed messages. The message process tracker 137 may be configured to generate operator alerts for failed messages. Failed message may occur due to, for example and not by limitation, delivery errors, application errors, engine errors, other component errors, or otherwise. Depending on the nature of a given message failure, a message may be discarded, designated for operator intervention, or otherwise addressed.

For at least one implementation, the message process tracker 137 may be configured to pass one or more messages that have been successfully consumed, by the 1BES 132, and processed by a worker, to a second verification check. The second verification check may be used with successfully consumed and processed messages.

For at least one implementation, the message process tracker 137 may be configured to include a work allocator. The work allocator may designate different threads, with a given message being designated to a given thread. The threads may correspond to one or more classifications, topics, partitions, or otherwise.

For at least one implementation, a thread corresponds, at any given time, to a single message. For at least one implementation, messages are not added to a given thread until an existing message on the thread has been processed. When processing of a given message is completed by a worker, the worker may be configured to generate a notification to the message process tracker 137 and await receipt, from a consumer engine of a new message for processing. For at least one implementation, the message process tracker 137 may partition consumed messages into one or more worker queues. The worker queues may be partitioned based on one or more classifications, keys, message data fields, or the like. For at least one implementation a worker queue corresponds to a user ID; thereby inhibiting concurrent processing of messages, for a given user ID, by multiple workers.

For at least one implementation, the message process tracker 137 may be configured to delay processing, by a worker, of a resettlement received before a corresponding message is processed. The delayed processing operations may include first verifying, with a given worker, that sums have been deposited into a user's account to satisfy a resettlement amount. For at least one implementation when a resettlement amount is greater than a current account balance for a given user's account, the message process tracker 137 may delay providing of the resettlement message into the queue for the worker associated with the given user ID until one or more settlement messages are consumed and processed by the work for the given user ID and the user's account has a balance greater than the resettlement amount.

Although various implementations have been described above with a degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A process comprising:

executing, by a processor in a first back-end server for an online gaming system, non-transient computer instructions which instantiate a first consumer engine, a second consumer engine, and a message process tracker;

wherein the online gaming system includes:

a front-end server coupled to the first back-end server; and a second back-end server, coupled to the first back-end server, instantiating a first worker and a second worker; and wherein the first consumer engine instructs the first back-end server to consume a first online gaming message, having first data fields, published onto a first message data stream by the front-end server, by performing consuming operations, within an acceptable delay period, comprising:

periodically polling the first message data stream to determine whether the front-end server has published the first online gaming message onto the first message data stream;

identifying a first classification, assigned by the message process tracker, for the first consumer engine;

retrieving the first online gaming message from the first message data stream;

calculating a hash value for the first online gaming message based on data provided in the first data fields;

determining, based on the hash value, a second classification for the first online gaming message;

determining whether the first classification matches the second classification;

designating, when the first classification matches the second classification, the first online gaming message for processing by the first worker; and providing the first online gaming message to the first worker;

wherein the second consumer engine performs one or more of the consuming operations with respect to a second online gaming message published on the first message data stream; and wherein the message process tracker coordinates processing, by the first worker, of the first online gaming message with a processing, by a second worker, of the second online gaming message.

2. The process of claim 1, wherein the first online gaming message further comprises a settlement message for a bet placed by a user of the online gaming system.

3. The process of claim 2, further comprising:

wherein the periodically polling further comprises determining whether the front-end server has published the second online gaming message onto the first message data stream;

determining a third classification for the second online gaming message;

determining whether the first classification matches the third classification;

when the first classification matches the third classification, designating the second online gaming message for processing by the first worker;

when the third classification matches a fourth classification for the second consumer engine, designating the second online gaming message for processing by the second worker;

determining whether a time-ordered relationship exists between the second online gaming message and the first online gaming message; and when the time ordered relationship exists, delaying processing of the second online gaming message by the second worker until after processing of the first online gaming message by the first worker is complete.

4. The process of claim 3, wherein the first online gaming message is a settlement message for a bet placed by a user of the online gaming system;

wherein the second online gaming message is a boost message; and wherein the boost message provides an adjustment to an amount specified by the settlement message to be paid to the user.

5. The process of claim 3, wherein the first online gaming message includes, in the first data fields, data specifying a user ID, an operation ID, a merchant ID, an amount, a bet ID, and an event status; and wherein the second online gaming message includes, in second data fields, data specifying the user ID, the operation ID, the merchant ID, the bet ID, and a boost ID.

* * * * *